US005822539A

United States Patent [19]
van Hoff

[11] Patent Number: 5,822,539
[45] Date of Patent: Oct. 13, 1998

[54] SYSTEM FOR ADDING REQUESTED DOCUMENT CROSS REFERENCES TO A DOCUMENT BY ANNOTATION PROXY CONFIGURED TO MERGE AND A DIRECTORY GENERATOR AND ANNOTATION SERVER

[75] Inventor: Arthur A. van Hoff, Mountain View, Calif.

[73] Assignee: Sun Microsystems, Inc., Palo Alto, Calif.

[21] Appl. No.: 569,747

[22] Filed: Dec. 8, 1995

[51] Int. Cl.$^6$ ...................................................... G06F 13/00
[52] U.S. Cl. ............................... 395/200.66; 395/200.33
[58] Field of Search ............................... 395/200.09, 610

[56] References Cited

U.S. PATENT DOCUMENTS

| | | | |
|---|---|---|---|
| 5,239,466 | 8/1993 | Morgan et al. | 395/148 |
| 5,297,249 | 3/1994 | Bernstein et al. | 395/56 |
| 5,347,632 | 9/1994 | Filepp et al. | 395/200.09 |
| 5,446,891 | 8/1995 | Kaplan et al. | 395/600 |
| 5,608,900 | 3/1997 | Dockter et al. | 395/613 |
| 5,659,676 | 8/1997 | Redpath | 395/777 |

FOREIGN PATENT DOCUMENTS

| | | |
|---|---|---|
| 96308723 | 4/1997 | European Pat. Off. . |

OTHER PUBLICATIONS

D. LaLiberte et al, A protocol for scalable group and public annotations, Computer Networks and ISDN Systems, pp. 911–918, May 1995.

Roscheisen et al, Beyond browsing: Shared Comments, SOAPS, trails, and on–line communities, Computer Networks and ISDN Systems, pp. 739–749, May 1995.

Dodge, C., et al., "Web cataloguing through cache exploitation and steps toward consistency maintenance", Computer Networks and ISDN Systems, Apr. 1995, Netherlands, vol. 27, No. 6, pp. 1003–1008.

Ken Thompson, "Regular Expression Search Algorithm," *Communications of the ACM*, Jun. 1968, vol. 11, No. 6, pp. 419–422.

(List continued on next page.)

*Primary Examiner*—Thomas C. Lee
*Assistant Examiner*—Anderson I. Chen
*Attorney, Agent, or Firm*—Gary S. Williams; Flehr Hohbach Test Albritton & Herbert LLP

[57] ABSTRACT

In a distributed computer system, an automated document annotation system and method adds hypertext cross-references to a set of known information sources into documents requested by a client computer in such a way that the merged document is displayable by existing Web browsers. The distributed computer network incorporates a plurality of servers to store documents. Each stored document has a unique document identifier and is viewable from a client computer having a browser configured to request and receive documents over the network. An annotation proxy, which is a software procedure configured to merge a requested document from a first server with hypertext links to documents containing associated supplemental information. The set of hypertext links and criteria for identifying where such links should be added to requested documents are defined by one or more dictionaries of cross-references. The annotation proxy then relays the merged document to a receiver unit that is selected from another proxy, such as a firewall proxy or another annotation overlay proxy, or the browser, which ultimately displays the merged document. The annotation proxy optionally includes a dictionary generator that generates a dictionary of references to documents requested by the user, each reference in the dictionary indicating the textual context of the hypertext link or links used to request the associated document. The generated dictionary represents information sources known and used by the user. The annotation proxy then annotates requested documents with cross-references in the dictionary that was generated by the annotation proxy.

9 Claims, 3 Drawing Sheets

OTHER PUBLICATIONS

Kin–Man Chung and Herbert Yuen,"A 'Tiny' Pascal Compiler; Part 1: The P–Code Interpreter," *BYTE Publications, Inc.,* Sep. 1978.

Kin–Man Chung and Herbert Yuen, "A 'Tiny' Pascal Compiler; Part 2: The P–Compiler," *BYTE Publications, Inc.,* Oct. 1978.

Gene McDaniel, "An Analysis of a Mesa Instruction Set," *Association for Computing Machinery,* May 1982.

Kenneth A. Pier, "A Retrospective on the Dorado, A High–Performance Personal Computer," *IEEE Computer Society, 10th Annual Intl. Symposium on Computer Architecture,* 1983, pp. 252–269.

James G. Mitchell, et al., "Messa Language Manual," *Xerox Corporation, Palo Alto Research Center.*

```
URLX1, "music synthesi*" w/10 "signal process*"
URLX2, "GPS"
...
```

FIG. 3

Similar signal processing techniques are used in music synthesizers <link to CR=URLX1>, as well as in ....

Hypertext link to specified URL

FIG. 4

Similar signal processing techniques are used in music synthesizers <link to CR=URLX1, RI=2>, as well as in ....

Hypertext link to specified URL with RI=2

FIG. 5

SYSTEM FOR ADDING REQUESTED DOCUMENT CROSS REFERENCES TO A DOCUMENT BY ANNOTATION PROXY CONFIGURED TO MERGE AND A DIRECTORY GENERATOR AND ANNOTATION SERVER

The present invention relates generally to computer networks, and particularly to proxy servers used to supplement the information found in documents stored on computer networks.

BACKGROUND OF THE INVENTION

The World-Wide Web ("WWW") links many of the servers making up the Internet, each storing documents identified by unique universal resource locators (URLs). Many of the documents stored on Web servers are written in a standard document description language called HTML (hypertext markup language). Using HTML, a designer of Web documents can associate hypertext links or annotations with specific words or phrases in a document (these hypertext links identify the URLs of other Web documents or other parts of the same document providing information related to the words or phrases) and specify visual aspects and the content of a Web page.

A user accesses documents stored on the WWW using a Web browser (a computer program designed to display HTML documents and communicate with Web servers) running on a Web client connected to the Internet. Typically, this is done by the user selecting a hypertext link (typically displayed by the Web browser as a highlighted word or phrase) within a document being viewed with the Web browser. The Web browser then issues a HTTP (hypertext transfer protocol) request for the requested document to the Web server identified by the requested document's URL. In response, the designated Web server returns the requested document to the Web browser, also using the HTTP.

Many entities, especially corporations that allow access from corporate systems to the Web, modify this document access process by providing a firewall proxy running on a proxy server situated between the Web client running the browser and the various Web servers hosting the requested documents. In this modified situation, all HTTP requests issued by the browser and all documents returned by the Web servers simply routed through the firewall proxy, which implements a proxy server communications protocol that is a subset of the HTTP. Apart from providing a buffer between the Web client and servers, and preventing the client from receiving messages which violate certain security criteria, a pure firewall proxy performs no additional operations on the transferred information. Another common type of firewall proxy is a caching firewall proxy, which caches requested documents to provide faster subsequent access to those documents.

The ease of access and page design provided by the Web has proved attractive to many types of uses; e.g., individuals and corporations, who have not traditionally used the Internet. Additionally, the WWW is increasingly being used for commercial purposes, such as advertising and sales. Together, the new users and new uses mean that an information explosion Is occurring on the Web. With this information explosion it is becoming increasingly important that Web users be able to supplement the HYPERTEXT LINKS in Web documents with additional HYPERTEXT LINKS to additional information resources. For example, a Web user may have previously located a set of Web pages at a number of remote sites that relate to a particular field of interest (e.g., a particular field of engineering, science, music, etc.). The user may wish to provide additional references within a received Web document to this previously located set of Web pages by annotating the received Web document with HYPERTEXT LINKS to these Web pages.

It is a goal of the present invention to provide a system and method for automatically annotating a received document so as to interconnect that document via HYPERTEXT LINKS to a set of documents known to contain supplemental information related to the topic of the received document.

It is another goal of the present invention that the annotation system and method would be implemented in a manner that is compatible with existing Web browsers and the HTTP.

One system that uses a proxy server to dynamically modify received documents is the Open Software Foundation's World Wide Web Agent Toolkit, or OreO. OreO allows users to build personal agents that can perform filtering functions on requested documents before they are viewed using the Web browser. The agents created with OreO can be used in pipeline anywhere between a traditional Web client (i.e., Web browser) and a Web server to perform more complex and varied filtering of Web transactions. For example, a user could connect an obscenity filter in series with a violence filter to ensure appropriate Web browsing for their children. OreO makes this pipelining possible by providing agent interfaces that make each agent look like a traditional Web client on one side and a proxy server on the other.

However, because the OreO toolkit does not address the creation of dictionaries or libraries of supplemental materials, OreO agents are not well-suited to merge cross-references to supplemental materials from sources other than the creator of a requested document with the requested document. Moreover, OreO agents can only perform filtering by parsing all requested documents looking for occurrences of certain key phrases or patterns then deleting or replacing those key phrases or patterns.

Therefore, there is a need for a system that introduces a proxy server between Web servers and clients that allows parts of requested documents to be annotated with hyperlink cross-references to supplemental materials before the documents are viewed with a Web browser. Unlike the OreO agent, this system should perform the aforementioned annotating based on sources of supplemental materials associated with Web servers that might be completely unrelated to the author of the requested document. Ideally, a user should be able to indicate to the proxy server a set of well established dictionaries, directories, or libraries of information sources for which cross-references should be merged into received documents. Then, when the user requests a document, that request should be relayed through the proxy, which merges the requested document with cross-references to the user-specified supplemental information sources. The resulting merged document should be viewable with any existing Web browser.

Alternatively, the system should allow a user of the proxy to direct the proxy to generate and add to a dictionary of cross-references annotations from sources accessed by the user over a period time. Then, when a user requests a document, the proxy should be able to merge cross-references in the dictionary with the requested document, eliminating the need to search the Web for the appropriate supplemental materials.

SUMMARY OF THE INVENTION

In summary, the present invention is a system and method for merging hypertext cross-references to a set of known information sources with documents requested over the Web in such a way that the merged document is displayable by existing Web browsers.

Specifically, the present invention provides a system and method for providing hypertext link annotations for documents requested over a distributed computer network that incorporates a plurality of servers to store the documents. Each stored document has a unique document identifier and is viewable from a client computer having a browser configured to request and receive documents over the network.

Another feature of the present invention is an annotation proxy, which is a software procedure configured to merge a requested document from a first server with hypertext links to documents containing associated supplemental information, where the set of hypertext links and criteria for identifying where such links should be added to requested documents are defined by one or more dictionaries of cross-references. The annotation proxy then relays the merged document to a receiver unit that is selected from another proxy (possibly a firewall proxy or another annotation overlay proxy) or the browser, which ultimately displays the merged document.

In a preferred embodiment the annotation proxy can generate a dictionary of references to documents requested by the user, each reference in the dictionary indicating the textual context of the hypertext link or links used to request the associated document. The generated dictionary thus represents information sources known and used by the user. The annotation proxy can then annotate requested documents with cross-references in the dictionary that was generated by the annotation proxy.

The present invention is also a method usable in the same type of computer network for providing hypertext link annotations for a requested document. As a first step, at least one dictionary of hypertext links to supplemental documents is stored. A merged document is then formed by merging a requested document stored on a first server with hypertext link annotations from the dictionary when the text or other content in the document matches corresponding merge criteria. This merged document is then relayed to a receiver selected from another proxy or said browser.

BRIEF DESCRIPTION OF THE DRAWINGS

Additional objects and features of the invention will be more readily apparent from the following detailed description and appended claims when taken in conjunction with the drawings, in which:

FIG. 3 is an illustration of an exemplary annotation directory showing the contents of a cross reference source field and match pattern field.

FIG. 4 is an illustration of the manner in which an annotation in the form of a hypertext link to a specified URL is added to a portion of a document.

FIG. 5 is an illustration of an exemplary annotation directory of an alternative embodiment of the invention showing the contents of a cross reference source field, a match pattern field, and a relevance index field.

DESCRIPTION OF THE PREFERRED EMBODIMENTS

Figure 1:
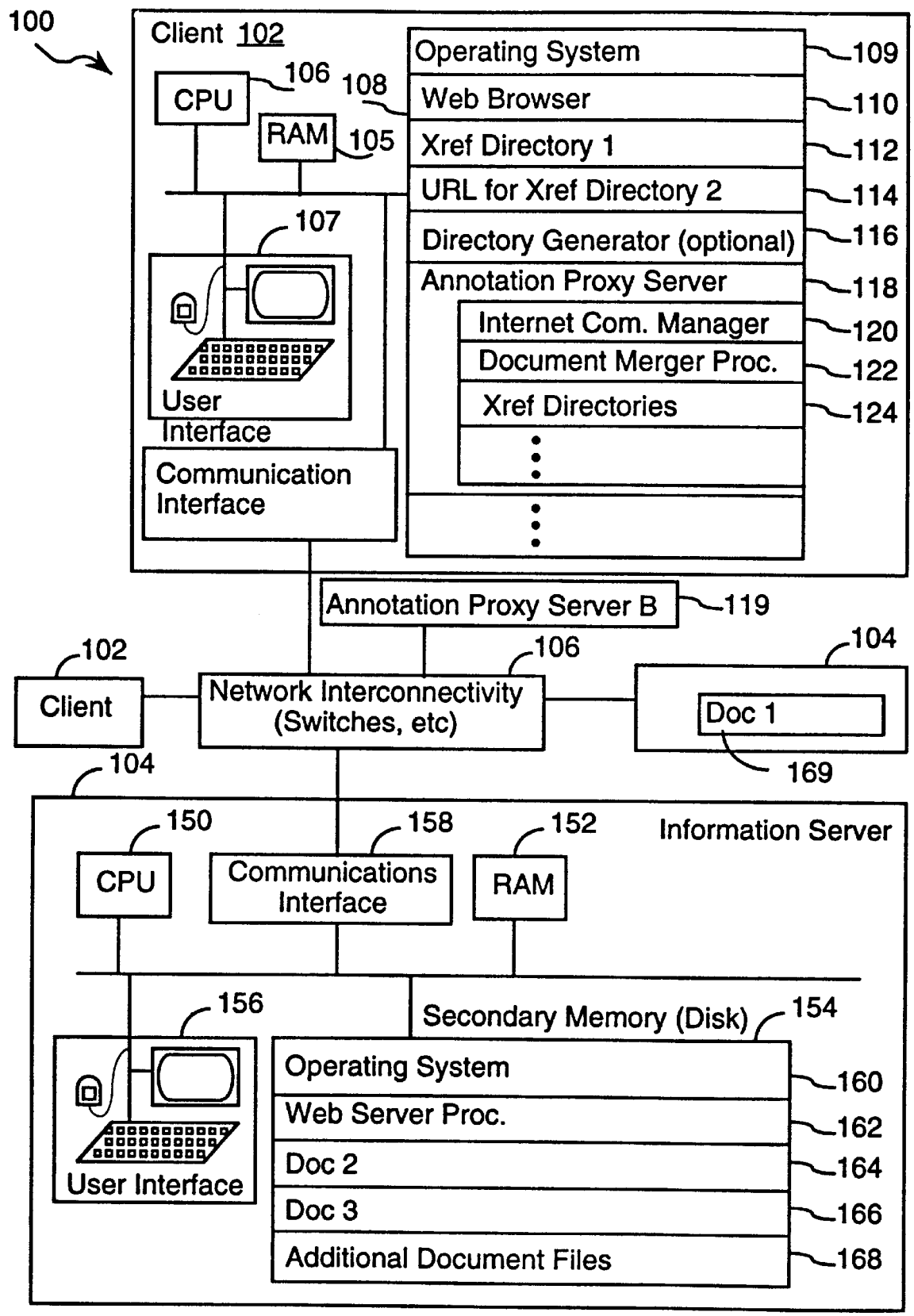
FIG. 1 is a block diagram of a distributed computer system incorporating the present invention.

Referring to FIG. 1, there is shown a distributed computer system 100 having many client computers 102 and at least one remotely located information server computer 104. In the preferred embodiment, each client computer 102 is connected to the information server 104 via the Internet 106, although other types of communication connections could be used. While most client computers are desktop computers, such as Sun workstations, IBM compatible computers and Macintosh computers, virtually any type of computer can be a client computer.

In the preferred embodiment, each client computer 102 includes a communications interface 103 for communicating with the information server 104 and/or a remote annotation proxy server 119 (if provided), RAM 105, a CPU 106, a user interface 107, and memory 108 for storing an operating system 109, a World Wide Web browser program 110, at least one cross reference dictionary or directory (Xref Directory 1) 112 and/or a URL pointer 114 to a cross reference directory (Xref Directory 2) located on a remotely located computer, a cross reference directory generator procedure 116, and an annotation proxy server procedure 118. Note in the context of annotation proxy servers, the term directory as in annotation directory is synonymous with dictionary.

While in the preferred embodiment the annotation proxy server (Annotation Proxy Server A) 118 is executed on the same hardware platform as the user's Web browser 110, the annotation proxy server 118 could also be executed on another linked computer. In fact, multiple annotation proxy servers 118, 119 may be provided on network 100 and the user may select the most appropriate annotation proxy server for the document requested. For example, in an alternative embodiment of the invention, annotation proxy server 119 may be provided instead of or in addition to annotation proxy server 118. For a remotely located proxy server 119, the client computer 102 requests a document (e.g. Doc 1) from information server 104 with instructions to forward the document to proxy server 119. The document is annotated upon receipt by the proxy server and then retransmitted to the requesting client over network 100.

In either embodiment, the annotation proxy server 118 includes a document merger procedure 122 which performs document parsing and annotation, one or more cross reference (Xref) directories 124, and an Internet communications manager 120. When the proxy server is resident on the same hardware as the client computer, communications interface 103 may be incorporated into the Internet communications manager.

The information server 104 includes a central processing unit (CPU) 150, primary memory 152 (i.e., fast random access memory) and secondary memory 154 (typically disk storage), a user interface 156, a communications interface 158 for communication with the client computers 102 via the communications network 106. For the purposes of the present discussion, it will be assumed that each information server's secondary memory 154 stores: an operating system 160, a Web server procedure 162, and document files 164, 166, 168.

Figure 2:
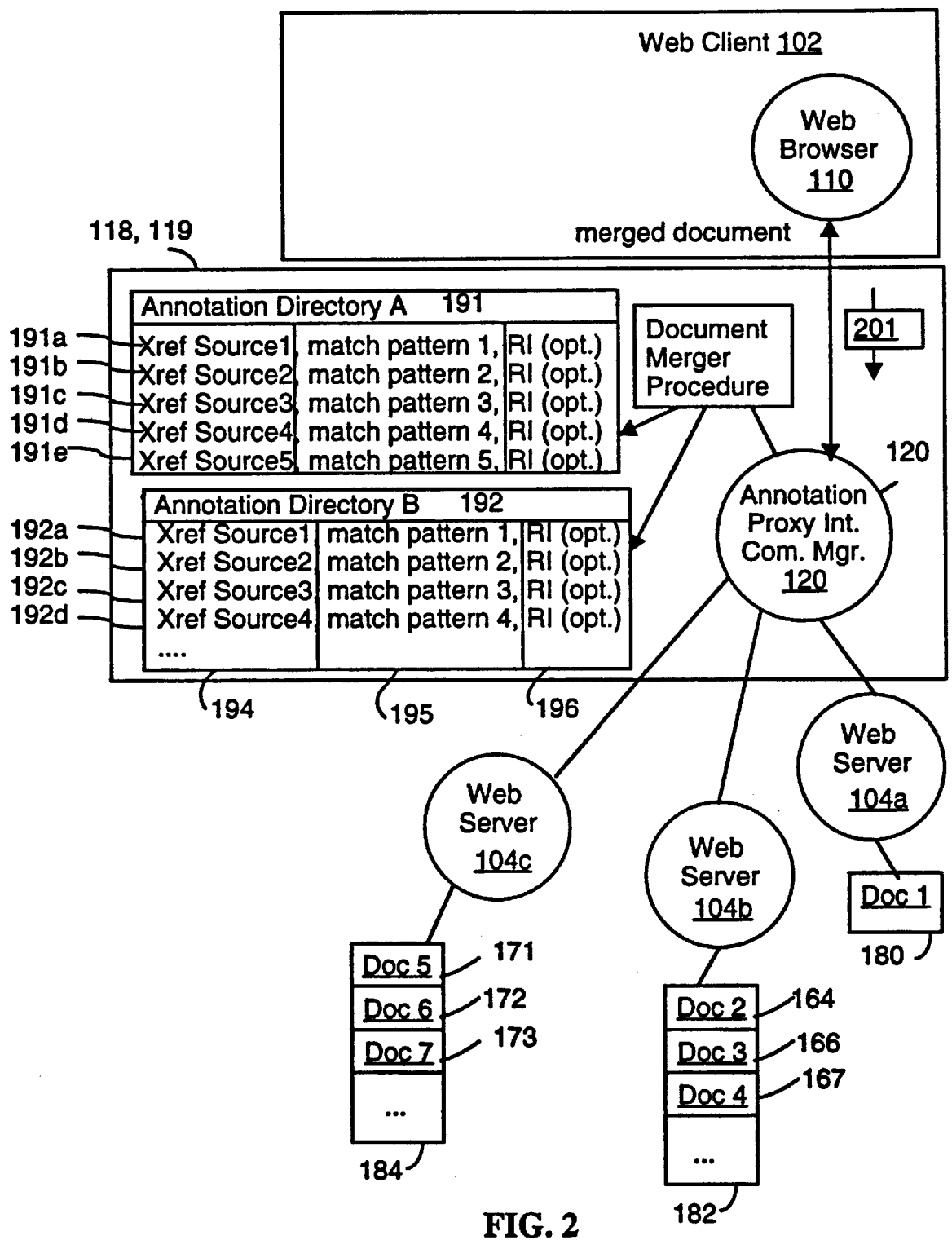
FIG. 2 is a block diagram of a preferred embodiment of the present invention, showing the relationship between a web client, a web server, and an annotation proxy server agent interposed between the web client and the web server.

Referring to FIG. 2, there is shown a block diagram of an embodiment of the inventive system showing the relationship between a web client computer 102, a plurality of web information servers 104, and an annotation proxy server 118 interposed between one of the web client computer 102 and the web information server 104. In the embodiment illustrated in FIG. 2, server 104*a* stores a document (Doc 1) 169 in document storage 180, server 104*b* stores a plurality of documents (Doc 2, Doc 3, Doc 4) 164, 166, 167 in document storage 182, and server 104*c* stores a plurality of documents (Doc 5, Doc 6, Doc 7) 171, 172, 173 in document storage 184. Each web server 104a, 104b, and 104c have the characteristics of information server 104 as already described relative to FIG. 1. In the preferred embodiment, annotation proxy server 118 is located on the same platform as the client computer 102; however, the annotation proxy server 118 may alternatively be located on a computer different from the client computer 102 on which the document request was initiated or on a web server 104 different from that on which the requested document originally resides. Each document is identifiable by a unique document identifier. The document identifier may include a first location identifier data that identifies the location of the document as a particular web server location (such as a URL reference to the Web site) on the distributed computer system 100, and may further include a second document identifier data that identifies the document within that particular web server site, such as a name. The document need not actually contain or store the document identifier so long as the network 100 including server 104 provide means for locating and addressing each document. For example, a file management system on server 104 may provide file addressing capability once the request for a document has been routed from the client computer to the server 104 storing the requested document. In general, a requested document and any cross-referenced documents can be on the same or different servers 104, at any Web sites anywhere.

Each annotation proxy server (APS) 118, 119 includes one or more annotation directory 191, 192. Each annotation directory is uniquely identifiable, such as by name or number so that a user associated with a client computer 102 may select the desired annotation directory from among several that may be present on the proxy server 118, 119. Each annotation directory 191, 192 includes a plurality of paired entries (e.g. 191a, 191b, 191c, 191d, 191e; and 192a, 192b, 192c, 192d) where each paired entry includes a cross reference document source field 194 and a match pattern field 195. Each cross-reference source field 194 identifies the unique location of a cross reference document, and each match pattern field 195 defines a character pattern (including symbols, words, characters, phrases, numbers, and the like). If the character pattern is found in a requested document, that indicates that an annotation linking the portion of the document associated with the matching pattern to the paired cross reference source should be added to the requested document. For example, if match pattern 3 in annotation directory 191 is the phrase "JAVA!" and the paired cross-reference source 3 is SUN.COM.JAVAINFO, then a hyperlink annotation "<link to SUN.COM.JAVAINFO>" will be added to the requested document in association with the "JAVA!" phrase pattern. Other fields may optionally be provided in the directory, such as an optional relevance indicator field 196 to indicate the relevance or importance of the associated match pattern 195 or cross-reference source 194. The optional use of relevance information is described in greater detail hereinafter.

When web client 102 requests a document such as document "Doc3" 166 stored in document storage 182 located on web server 104b using web browser 110, the user associated with client computer 102 also specifies an annotation proxy server 118, and one of the annotation directories 191, 192 provided on that server. If the annotation proxy server 118 has only a single annotation directory, such as when the proxy server is resident on the client computer making the request and the user has provided an annotation directory for use on all requested documents, then explicit specification of the directory may be unnecessary. Furthermore, in the preferred embodiment the user may specify an annotation proxy and set of annotation directories to be used for annotating all future document requests until the user specifies a different annotation proxy and/or set of annotation directories.

Further, the specification of a particular annotation proxy server 118 may either be specified by an explicit command from the client 102 at the time the document is requested or implicitly specified, such as using the proxy server 118 resident on the client computer as a default if no other proxy server is specified, or based on characteristics of the requested document, user history, or other user preferences. When explicit specification of a proxy is required or desired, the user associated with the client computer may specify a particular annotation proxy server 118 and annotation directory by clicking one or more buttons on the client web page, or by entering an annotation proxy server identifier (such as by entering a proxy server name or URL) and an annotation proxy directory name or URL.

A document request on the client computer 102 ultimately results in receipt of a version of the document which is annotated with cross references in accordance with the selected annotation proxy sever and annotation directory. The specific commands generated and command and data pathways on the network 100 will depend somewhat on the locations of the requesting client 102, information server 104 storing the requested document, and the annotation proxy server 118. In particular, the command and data pathways will depend on whether the proxy server 118 is resident on the requesting client computer 102, resident on the same information server 104 that is providing the requested document, or provided by a separate annotation proxy computer site on the network.

In one embodiment where the annotation proxy server 118 is provided on the requesting client computer 102, the document request command 201 (which may include a requesting client computer identifier, a unique document identifier for the requested document, an identifier for the proxy server that will annotate the document, and an annotation directory identifier when applicable) is routed internally to the proxy server 118 which in turn transmits a request to the server 104 for the document using the unique document identifier and the requesting computer identifier. Information server 104 provides the requested document to the proxy server 118 which applies the identified annotation directory to the received document and provides the merged document to the browser 110 for viewing on the requesting client computer 102.

Once the request for document is received and recognized by the web server on which the requested document is stored, the web server prepares the document and transmits the document to the annotation proxy server 118 (which may be the same or a different computer from the requesting client computer) for annotation. If the annotation is performed on a remote proxy server 118, then annotation is performed prior to transmission of the document to the client 102, in a conventional manner.

In a different embodiment, the requesting computer may receive the unannotated document, retransmit it to any desired annotation proxy server and then receive the annotated document back from the proxy server after annotation. However, such a system and method are operable they are less efficient.

The manner of annotating a document are now described with reference to FIG. 3. The annotation proxy server 118 includes a set of hypertext linking rules or document merger procedures 122 for adding annotations, such as in the form of hypertext links, to a requested document. In simplest terms, the annotation proxy server parses the requested document and compares the characters, words, phrases, and the like with match patterns 195 in the selected annotation directory. Various search strategies and search engines for performing such comparisons are known in the art and are not discussed further. When a pattern identified in the designated annotation directory 191, 192 is present in the requested document an annotation is performed by adding to the requested document one or more cross references to the document associated with the identified pattern.

For example, with reference to FIG. 2, two exemplary annotation directories 191, 192 are shown. Each annotation directory 191, 192 includes a plurality of paired entries (e.g. 191a, 191b, 191c, 191d, 191e; and 192a, 192b, 192c, 192d) where each paired entry includes a cross reference document source field 194 and a match pattern field 195. Each cross-reference source field 194 identifies the unique location of a cross reference document, and each match pattern field 195 defines a character pattern (including symbols, words, characters, phrases, numbers, and the like) that defines where annotation hyperlinks to the cross reference document should be added to requested documents.

In reference to FIG. 3, there is shown a more specific example of entries in an annotation directory. Here, the entry URLX1 corresponds to the generic entry Xref Source 1, and the entry "music synthesi*" w/10 "signal process*" corresponds to the generic entry match pattern 1 of annotation directory 191 of FIG. 2. The "*" in the match pattern indicates a so called "wild card" character or characters which stand for no characters or one or more characters at that position in the text. Use of such wild card characters are known in conventional search techniques and not discussed further. In this example, whenever the text string "music synthesi*" appears within 10 words of the text string "signal process*" in the requested document, the requested document is annotated with an annotation to cross reference source 1. If the cross-reference "URLX1" is stored in the cross reference field 191a, then the document is annotated with "<link to CR=URLX1111>" where CR means cross-reference.

Similarly, if the text "GPS" appears anywhere in the requested document, then a link to URLX2 is established in the requested document. The pattern "GPS" is an example of a simple pattern that is a simple text string that does not include logical or boolean operators between search pattern segments. By comparison, the pattern "music synthesi*" w/10 "signal process*" is an example of a complex pattern which also includes boolean operations and proximity indicators (e.g. the within ten words "w/10" operator) and the like operators. Various conventional search strategies and search engines including strategies involving artificial intelligence and natural language processors may be used in conjunction with the inventive structure and method and are not described further herein.

In some embodiments of the invention, the annotations are defined using hypertext mark up language (HTML). Of course, annotations in formats other than HTML may be used. Those having ordinary skill in the art, in conjunction with this specification will realize that various syntax may be used in the annotation, including syntax compatible with conventional hypertext links and HTML language protocols. The hypertext link is added to the text in the requested document as indicated in FIG. 4 in conventional manner.

Each of the documents linked via the hypertext link annotations (e.g. source URLX1) are known to contain supplemental information related to the topic of the received document by way of the linked term or phrase (e.g. "music synthesi*" w/10 "signal process*").

In these examples, the annotations are hypertext links to other documents; however, the annotations are not limited to hypertext links and other types of annotations may be added. The annotations, including Hypertext Links, formed may be limited in any predetermined manner based on predetermined annotation limitation rules. Such rules may be defined by the requesting user, or may an information provider. For example, certain areas of a document may be selectively skipped or excluded from the parsing and annotation process when generating matches to the pattern for linking. For example, program code areas of a document, or portions of a document that provide examples, or bibliographies, or any other portions of a document that are readily identifiable may be excluded from pattern matching and annotation. In some instances, the document portions to be skipped will be identifiable based on location within the document (the title, or footnotes for example) while in other instances the portions to be skipped may be identified by the characteristics of the terms themselves (such as courier font, type style, upper or lower case, and the like characteristics.) The limitations may alternatively define portions of the document to be parsed and annotated, or portions of the document to be excluded from parsing and annotation. In some instances, parsing of the entire document may be required, in which case annotation of undesired portions may be suppressed after parsing.

In another embodiment of the invention, a natural language processor is provided for parsing the requested document and determining the grammatical usage of a term in the document. Inclusion of such a natural language processor would provide means for selectably including only terms used as nouns in the annotation while selectably suppressing other grammatical forms (e.g., verbs or adverbs, for example) from annotation.

Hypertext links may also contain a hierarchy of relevance indicators based on predetermined relevance rules. In general the relevance indicator may identify the information as having high relevance or low relevance such as a relevance indicator based on a numerical scale (e.g. relevance from 1–10, where relevance 1 is the highest relevance.)

In one embodiment of the invention, any hypertext links present in the document at the time of the request will be allocated a higher relevance indicator than hypertext links added after the user's request and annotation.

The annotation including hypertext links may be provided in a hierarchical format. For example, when a term in the document satisfies the match pattern in the annotation directory, the link may reflect a hierarchical cross-reference list in order of increasing specificity such as: "medical", "oncology", "melanoma", "treatment", and "radiation".

In embodiments of the inventive system and method that include relevance indicators, the color, font, style, or other attributes of the text associated with a hypertext link annotation may be altered to show the relevance. A variety of conventional approaches to altering the color, the font style, and the like attributes of linked terms may be implemented. In a further embodiment of the invention, the user may set a threshold during viewing to indicate which relevance indicator levels are to be displayed.

As described above, the annotations added to a document may optionally include a relevance information field 196 that provides information about the annotation, such as whether the annotation was present in the original document as requested by the client 102 (high relevance), or whether the annotation was added by the annotation proxy server 118. An indication of the relevance to be assigned is stored in the relevance field 196 in association with each match parameter 191a, 191b, 191c, 191d, 191e. After annotation, the document contains an indication of the assigned relevance along with the annotation. For example as illustrated in FIG. 5, the annotation may include an optional Relevance Index (RI) such that when the match pattern occurs in the document, an annotation link is provided ("<link to CR=URLX1, RI=2>") to cross-reference source URLX1 with a relevance index RI=2.

A variety of rules may be invoked by the client 102 and implemented by the annotation proxy server 118 and/or the client 102 to provided the desired relevance information. The assigned relevance index of the linked text may also affect the attributes of linked terms as they appear on the viewing screen. For example, text linked with relevance index RI=1 may appear in red, whereas text linked with relevance index RI=2 may appear in green.

In embodiments of the invention where the annotation proxy server 118 is resident on the web information server 104 which provided the requested document, the annotation and merging of the original document with the annotations to generate a hypertext link annotated document may occur prior to transmission of the document to the client 102. If the annotation proxy server 118 is resident on a different web information server site than the server which provided the requested document or the client computer 102 which requested the document, then the original document is transmitted to the remote APS 118 for annotation to generate a hypertext link annotated document, which is then transmitted to the client 102.

Table 1 sets forth a Pseudocode Representation of Annotation Proxy Procedure. The annotation Proxy Procedure may include or invoke one or more of three sub procedures: (1) an Install Cross-Reference Directory subprocedure, (2) an Uninstall Cross-Reference Directory, and (3) a Request and Merge Document subprocedure.

The Install Cross-Reference Directory subprocedure is responsible for retrieving and adding a document(DocURL) to set of dictionaries (directories) used by Annotation Proxy Procedure. The Uninstall Cross-Reference Directory subprocedure is responsible for deleting the appropriate installed directories depending upon the value of the DocURL parameter in the subprocedure call. If DocURL= "*", then all of the installed directories are deleted; otherwise, only the directory specified by the DocURL parameter is deleted.

The Request and Merge Document (DocURL) subprocedure is responsible for requesting and receiving document specified by the DocURL parameter in the subprocedure call. For all items in all installed cross-reference directories, the subprocedure finds or locates all text matching a specified pattern and inserts (annotates) a cross-reference to corresponding document. It then sends the merged document to the requester, where the requestor may be the client or may be another proxy.

Cross-reference directories may originate or be provided by various entities. For example, cross-reference dictionaries may be prepared by information service providers, educational institutions, publishers, good Samaritans, and the like for use by a variety of users. Such predefined cross-reference directories are at known URLs. Cross-reference directories may also be generated by the client or a workgroup associated with the client for non-public or other controlled use with his or her own documents.

Cross reference directories 112 prepared by the client include at least two types. A first type of dictionary, referred to here as a "frequency of occurance directory," may be maintained in a manner that automatically keeps track of the most frequently referenced Web pages and the key words associated with their hypertext links. In a second type of dictionary, referred to here as a "user maintainable directory" the directory may be maintained in a manner such that the Web browser includes a link to an optional directory generator 116 that allows the client/user to modify the dictionary 112, by for example instructing the directory generator 116 via the Web browser 110 to "add a reference to this particular document to my personal cross-reference directory", or by editing the match pattern criteria if the user doesn't like the default matching pattern provided in an existing annotation directory. Aspects of the two user generated dictionaries may be combined and either or both may be used in combination with predefined dictionaries created or maintained by others.

In another embodiment of the invention, the cross-reference directories 112 may be self generating, and are referred to here as a "self-generating directories." In such a self generating cross reference directory 112, a directory generator 116 is provided on or in association with a document provider, web information server 104, client computer 102, annotation proxy server 118, or any other location on network 100 through which documents pass and could be read to construct a cross-reference directory.

In simplest terms, directory generator 116 "reads" documents and identifies, statistically analyzes, and stores, the links between particular terms present in the document and cross-linked references within that document, and/or between one document source and another document source generally. The cross-reference dictionary 112, 191, 192 is built-up and improved over time as the number of documents read and contributing to the directory increases. Various rules are advantageously implemented in the directory generator 116 to provide predictability to the automatically generated dictionary.

In the embodiment of the invention illustrated in FIG. 1, the directory generator 116 is shown in association with the client computer 102. This may be the preferred location for constructing a personal user annotation directory because the annotations and cross references are derived from documents requested by the particular user and the cross references are expected to be relevant to the users interests. On the other hand, a directory generator residing elsewhere on the network 100 that sees a large number of documents is better positioned to construct a very complete and hierarchically deep annotation directory. Such a directory may be somewhat disadvantageous because of its potential size, and may include cross references that are somewhat irrelevant to a client computers needs.

In the preferred embodiment that includes the dictionary generator 116, the "match pattern" for each cross reference item 191, 192 in the automatically generated dictionary is the text for the hyperlink used to request the document. Alternately, the match pattern in the dictionary may be the text for the hypertext link plus a predefined amount of the preceding text (e.g., the preceding text going back to the beginning of the sentence or document section, but not more than X words). Furthermore, the document merger procedure 122 in this embodiment inserts annotations even when there is not an exact match between the match pattern of a dictionary item and the text of a requested document. In particular, the document merger procedure 122 looks for partial matches, and for each partial or full match that meets a threshold match requirement (e.g., a requirement of a match to at least the core portion of a match term) the merger procedure inserts a hyperlink annotation that includes a relevance indicator.

The relevance indicator is assigned a value in this preferred embodiment on a sliding scale such as 1 to 10 (where 1 represents the highest degree of relevance) based on the closeness of the match between the match pattern in the dictionary and the text of the requested document. Furthermore, the user may specify to the merger procedure 122 a relevance threshold. When a relevance threshold is specified, only annotations with an assigned relevance value equal to or higher than the relevance threshold (i.e., with an equal or lower numeric relevance value using the sliding scale mentioned above) are added to user requested documents. As indicated above, the value of the relevance indicator for each annotation can be indicated to the user (A) by displaying the relevance indicator for an annotation when it is selected by the user, or (B) by altering a visual characteristic of the text associated with the annotation, such as the text's color, font, or style to indicate the value of the relevance indicator of each annotation.

The above described "extent of matching" methodology for assigning relevance indicators to annotations during the document merger process can be applied equally well to the use of cross reference dictionaries provided by third parties.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

Pseudocode Representation of Annotation Proxy Procedure

Procedure: Install Cross-Reference Directory (DocURL)
{
Retrieve and add document(DocURL) to set of dictionaries used by Annotation Proxy Procedure
}

Procedure: Uninstall Cross-Reference Directory (DocURL)
{
If DocURL = ""
    {Delete all installed directories}
Else
    {Delete specified directory(DocURL)}
}

Procedure: Request and Merge Document (DocURL)
{
Request and receive document specified by DocURL
For all items in all installed cross-reference directories:
    {
    Find all text matching specified pattern and insert cross-reference to corresponding document.
    }
Send merged document to requester.
}

What is claimed is:

1. In a distributed computer system incorporating a plurality of servers used to store documents, each document having a unique document identifier, and a client computer having a browser configured to request and receive the documents over the distributed computer system, an annotation system for automatically adding to a requested document cross references to other documents, the annotation system comprising:

at least one directory of cross references to documents, each cross referenced document having a unique source identifier;

an annotation proxy configured to form a merged document by merging the requested document from a first server with annotations comprising cross references to documents referenced by the at least one directory and to relay the merged document to a receiver selected from another proxy and the browser; and a directory generator for automatically generating and updating the at least one directory of cross references to documents to include sources accessed by the client computer over a period time;

wherein the directory of cross references to documents includes entries, at least a subset of the entries each comprising a document identifier specifying a document and a pattern, the pattern indicating criteria for inserting the document identifier into the requested document when creating the merged document;

the annotation proxy includes instructions for accepting commands from the client computer identifying a set of directories to use when annotating the requested document, and for forming the merged document by merging the requested document with annotations comprising cross references to documents referenced by the client computer identified set of directories; and at least a subset of the annotations merged into the requested document each includes a relevance indicator, indicating likely relevance of the document referenced by the merged annotation.

2. The system of claim 1, wherein the annotations are hypertext links defined using hypertext mark up language (HTML).

3. The system of claim 1, wherein at least a subset of the directory entries each includes a relevance indicator, indicating likely relevance of the document referenced by the entry.

4. A method for automatically adding to a requested document cross references to other documents, the method comprising the steps of:

recognizing a request for a stored document by a client;

transmitting the requested document to an annotation proxy for annotation;

providing, in association with the annotation proxy, at least one directory of cross references to documents, each cross referenced document having a unique source identifier;

merging the requested document with annotations comprising cross references to documents referenced by the at least one directory; and relaying the merged document to a receiver selected from another proxy or the client;

the method further including automatically generating and updating the at least one directory of cross references to documents to include sources accessed by the client over a period time;

wherein the directory of cross references to documents includes entries, at least a subset of the entries each comprising a document identifier specifying a document and a pattern, the pattern indicating criteria for inserting the document identifier into the requested document when creating the merged document;

the annotation proxy includes instructions for accepting commands from the client computer identifying a set of directories to use when annotating the requested document, and for forming the merged document by merging the requested document with annotations comprising cross references to documents referenced by the client computer identified set of directories; and at least a subset of the annotations merged into the requested document each includes a relevance indicator, indicating likely relevance of the document referenced by the merged annotation.

5. The method of claim 4, wherein the annotations are hypertext links defined using hypertext mark up language (HTML).

6. The method of claim 4, wherein at least a subset of the directory entries each includes a relevance indicator, indicating likely relevance of the document referenced by the entry.

7. In a distributed computer system incorporating a plurality of servers used to store documents, each document having a unique document identifier, and a client computer having a browser configured to request and receive the documents over the distributed computer system, a computer program product for controlling the operation of the client computer during use of the browser, the computer program product comprising a computer readable storage medium and a computer program mechanism embedded therein, the computer program mechanism comprising:

at least one directory of cross references to documents, each cross referenced document having a unique source identifier;

an annotation proxy configured to form a merged document by merging the requested document from a first server with annotations comprising cross references to documents referenced by the at least one directory and to relay the merged document to a receiver selected from another proxy or the browser; and a directory generator for automatically generating and updating the at least one directory of cross references to documents to include sources accessed by the client computer over a period time;

wherein the directory of cross references to documents includes entries, at least a subset of the entries each comprising a document identifier specifying a document and a pattern, the pattern indicating criteria for inserting the document identifier into the requested document when creating the merged document;

the annotation proxy includes instructions for accepting commands from the client computer identifying a set of directories to use when annotating the requested document, and for forming the merged document by merging the requested document with annotations comprising cross references to documents referenced by the client computer identified set of directories; and at least a subset of the annotations merged into the requested document each includes a relevance indicator, indicating likely relevance of the document referenced by the merged annotation.

8. The computer program product of claim 7, wherein the annotations are hypertext links defined using hypertext mark up language (HTML).

9. The computer memory of claim 7, wherein at least a subset of the directory entries each includes a relevance indicator, indicating likely relevance of the document referenced by the entry.

\* \* \* \* \*